(12) United States Patent
Nicholson

(10) Patent No.: US 6,767,023 B1
(45) Date of Patent: Jul. 27, 2004

(54) TIRE-MOUNTED STEP DEVICE

(76) Inventor: Richard L. Nicholson, 12835 S. 200 East, Draper, UT (US) 84020

( * ) Notice: Subject to any disclaimer, the term of this patent is extended or adjusted under 35 U.S.C. 154(b) by 0 days.

(21) Appl. No.: 10/138,813

(22) Filed: May 6, 2002

(51) Int. Cl.$^7$ ................................................ B60R 3/00
(52) U.S. Cl. ....................... 280/165; 182/127; 182/150
(58) Field of Search ................................ 280/163, 165, 280/166, 169, 164.1, 164.2; 182/92, 150, 91, 88, 127; D12/203

(56) References Cited

U.S. PATENT DOCUMENTS

| | | | | |
|---|---|---|---|---|
| 893,930 A | * | 7/1908 | Lederman | 182/150 X |
| 2,176,772 A | * | 10/1939 | Smith | 182/150 X |
| 2,378,678 A | * | 6/1945 | Anderson | 182/150 |
| 2,575,503 A | * | 11/1951 | Warren | 182/150 |
| 2,848,150 A | * | 8/1958 | Tans | 182/150 |
| 2,973,052 A | * | 2/1961 | Miller | 182/150 |
| 3,590,950 A | * | 7/1971 | Wilson | 182/150 |
| 4,782,916 A | * | 11/1988 | Hays | 182/150 |
| 4,800,987 A | * | 1/1989 | Liles | 182/92 |
| 4,919,229 A | * | 4/1990 | Wells | 182/17 |
| 4,947,961 A | * | 8/1990 | Dudley | 182/92 |
| 5,133,429 A | * | 7/1992 | Densley | 182/150 |
| D448,335 S | * | 9/2001 | Ehnes | D12/203 |
| 6,550,578 B1 | * | 4/2003 | Law et al. | 182/150 |
| 6,659,224 B2 | * | 12/2003 | Medsker | 182/91 |

FOREIGN PATENT DOCUMENTS

DE        3700002      *  7/1988

* cited by examiner

Primary Examiner—Bryan Fischmann

(57) ABSTRACT

A tire-mounted step device for allowing a user to reach into the engine compartment of a vehicle for the servicing thereof. The tire-mounted step device includes a step having a main wall and a perimeter wall depending downwardly along a perimeter of the main wall; and also includes a bracket assembly being adjustably and foldably attached to the step; and further includes a brace assembly being pivotally attached to the step and being adapted to engage an exterior of a tire.

9 Claims, 4 Drawing Sheets

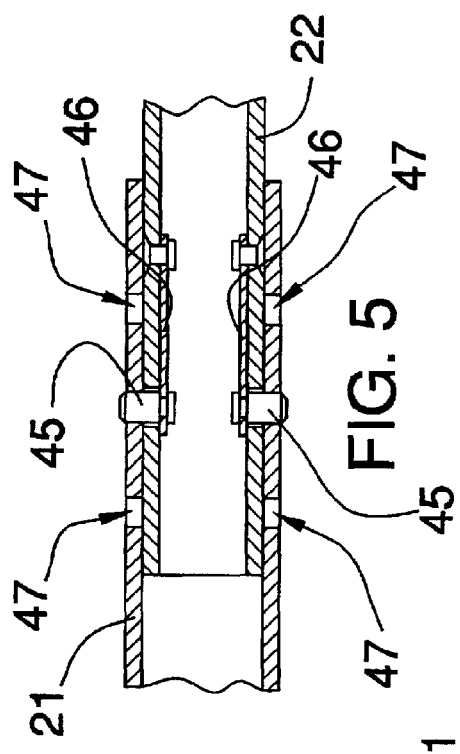
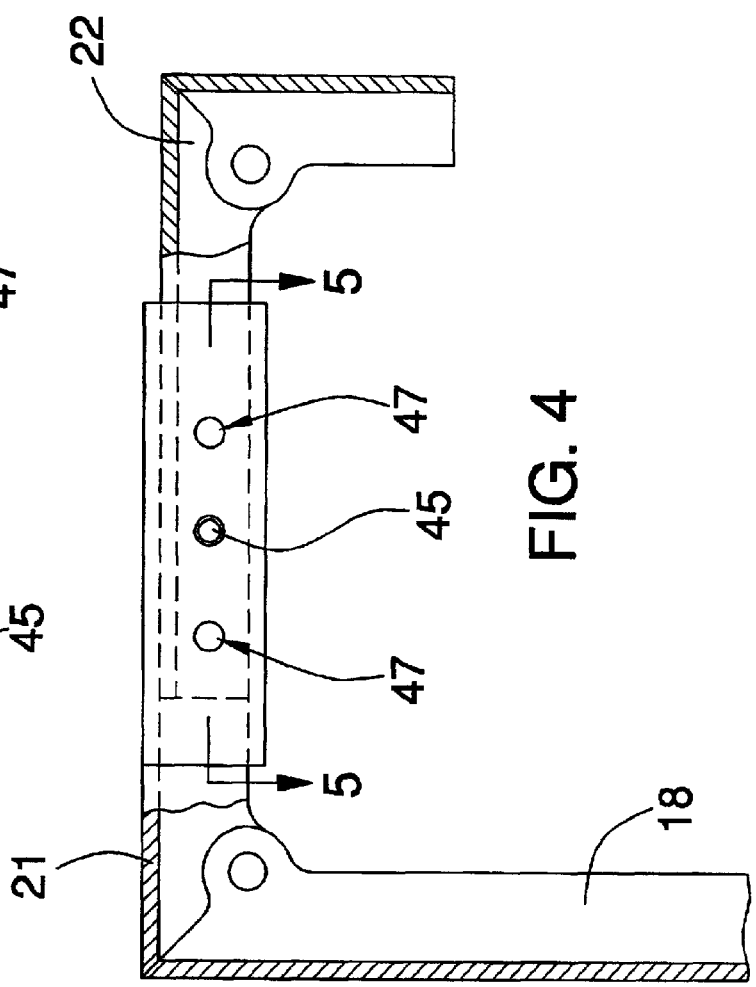

TIRE-MOUNTED STEP DEVICE

BACKGROUND OF THE INVENTION

1. Field of the Invention

The present invention relates to tire-mounted stands and more particularly pertains to a new tire-mounted step device for allowing a user to reach into the engine compartment of a vehicle for the servicing thereof.

2. Description of the Prior Art

The use of tire-mounted stands is known in the prior art. More specifically, tire-mounted stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,851,312; 4,947,961; 5,456,479; 4,782,916; U.S. Pat. No. Des. 394,628; and U.S. Pat. No. 4,556,126.

While these devices fulfill their respective, particular objectives and requirements, the aforementioned patents do not disclose a new tire-mounted step device. The prior art describes inventions having bracket members for hanging from a tire, and also having a step or platform for the user to stand upon.

SUMMARY OF THE INVENTION

The general purpose of the present invention, which will be described subsequently in greater detail, is to provide a new tire-mounted step device which has many of the advantages of the tire-mounted stands mentioned heretofore and many novel features that result in a new tire-mounted step device which is not anticipated, rendered obvious, suggested, or even implied by any of the prior art tire-mounted stands, either alone or in any combination thereof. The inventive device includes a step having a main wall and a perimeter wall depending downwardly along a perimeter of the main wall; and also includes a bracket assembly being adjustably and foldably attached to the step; and further includes a brace assembly being pivotally attached to the step and being adapted to engage an exterior of a tire. None of the prior art describes a bracket assembly which can be easily adjusted to fit different tire sizes with the first elongate members being dually adjustable, nor describes brace members which are biasedly engagable to the tire to securely hold the step device upon the tire.

There has thus been outlined, rather broadly, the more important features of the tire-mounted step device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tire-mounted step device which has many of the advantages of the tire-mounted stands mentioned heretofore and many novel features that result in a new tire-mounted step device which is not anticipated, rendered obvious, suggested, or even implied by any of the prior art tire-mounted stands, either alone or in any combination thereof.

Still another object of the present invention is to provide a new tire-mounted step device for allowing a user to reach into the engine compartment of a vehicle for the servicing thereof.

Still yet another object of the present invention is to provide a new tire-mounted step device that is easy and convenient to mount about a tire of a vehicle.

Even still another object of the present invention is to provide a new tire-mounted step device that can be easily adjusted to fit any tire size for vehicles having different sizes of tires.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a partial cross-sectional view of the bracket assembly of the present invention.

FIG. 5 is another partial cross-sectional view of the bracket assembly of the present invention.

DESCRIPTION OF THE PREFERRED EMBODIMENT

Figure 1:
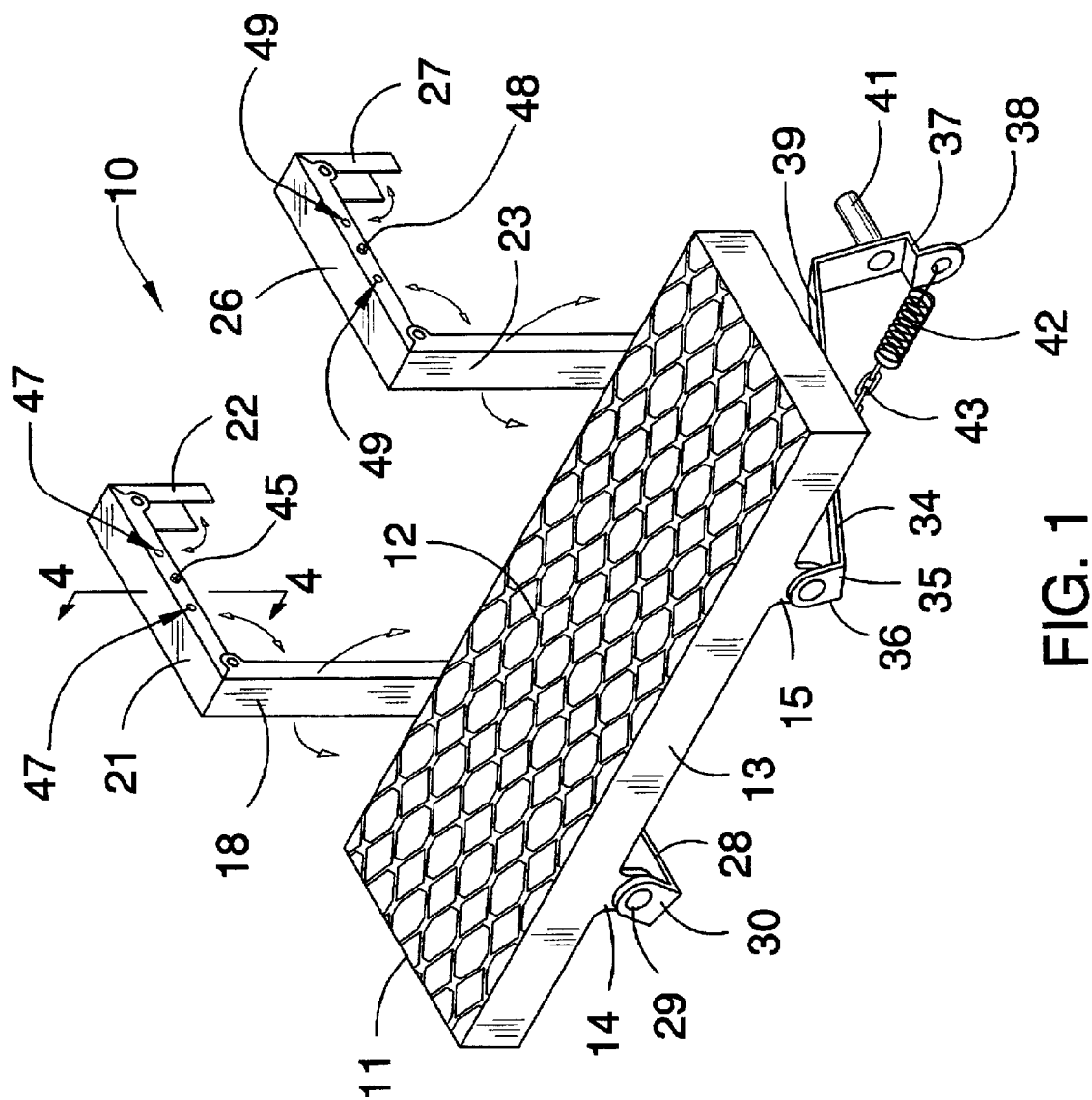
FIG. 1 is a perspective view of a new tire-mounted step device according to the present invention and shown in use.
Figure 2:
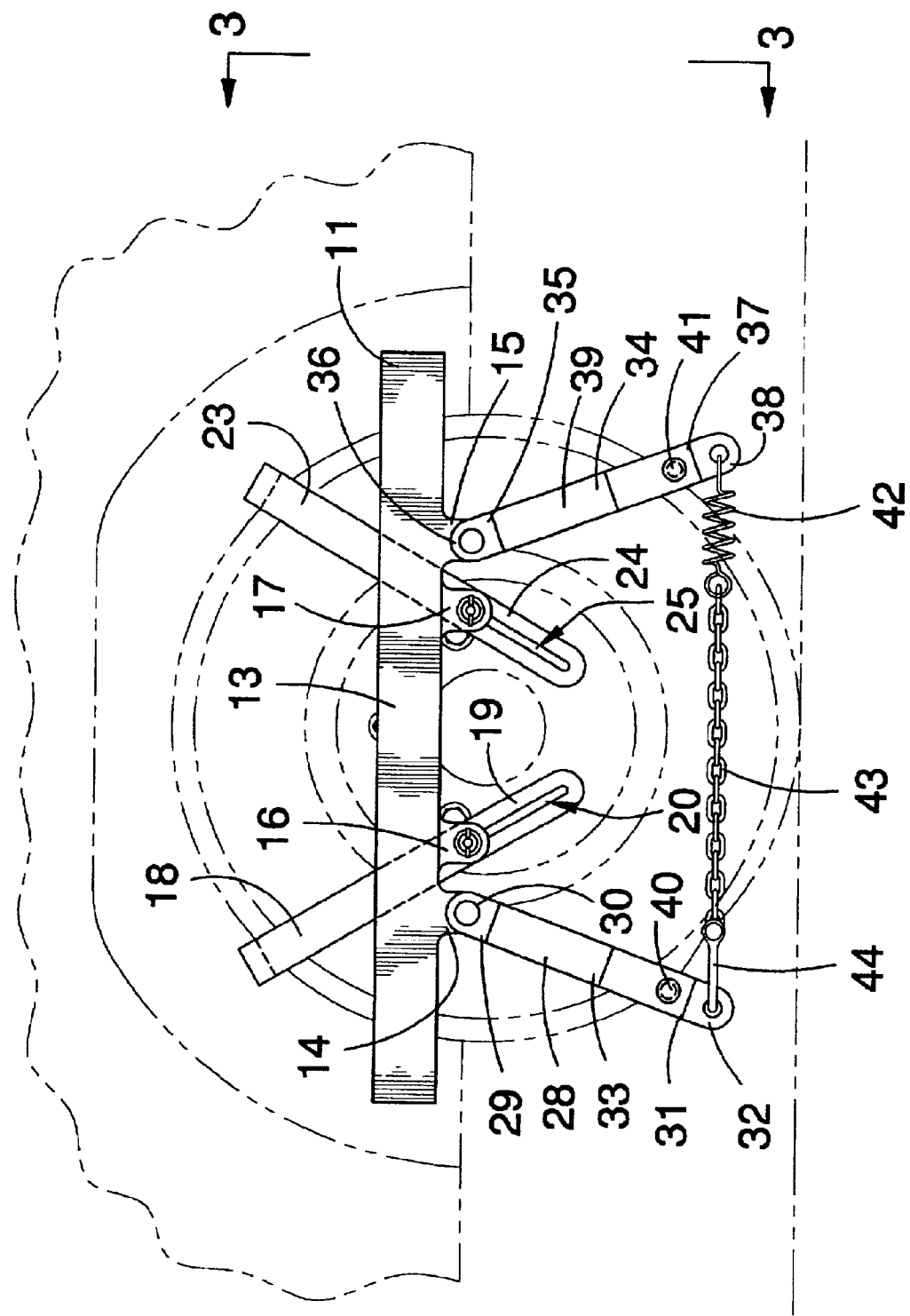
FIG. 2 is a front elevational view of the present invention shown in use.
Figure 3:
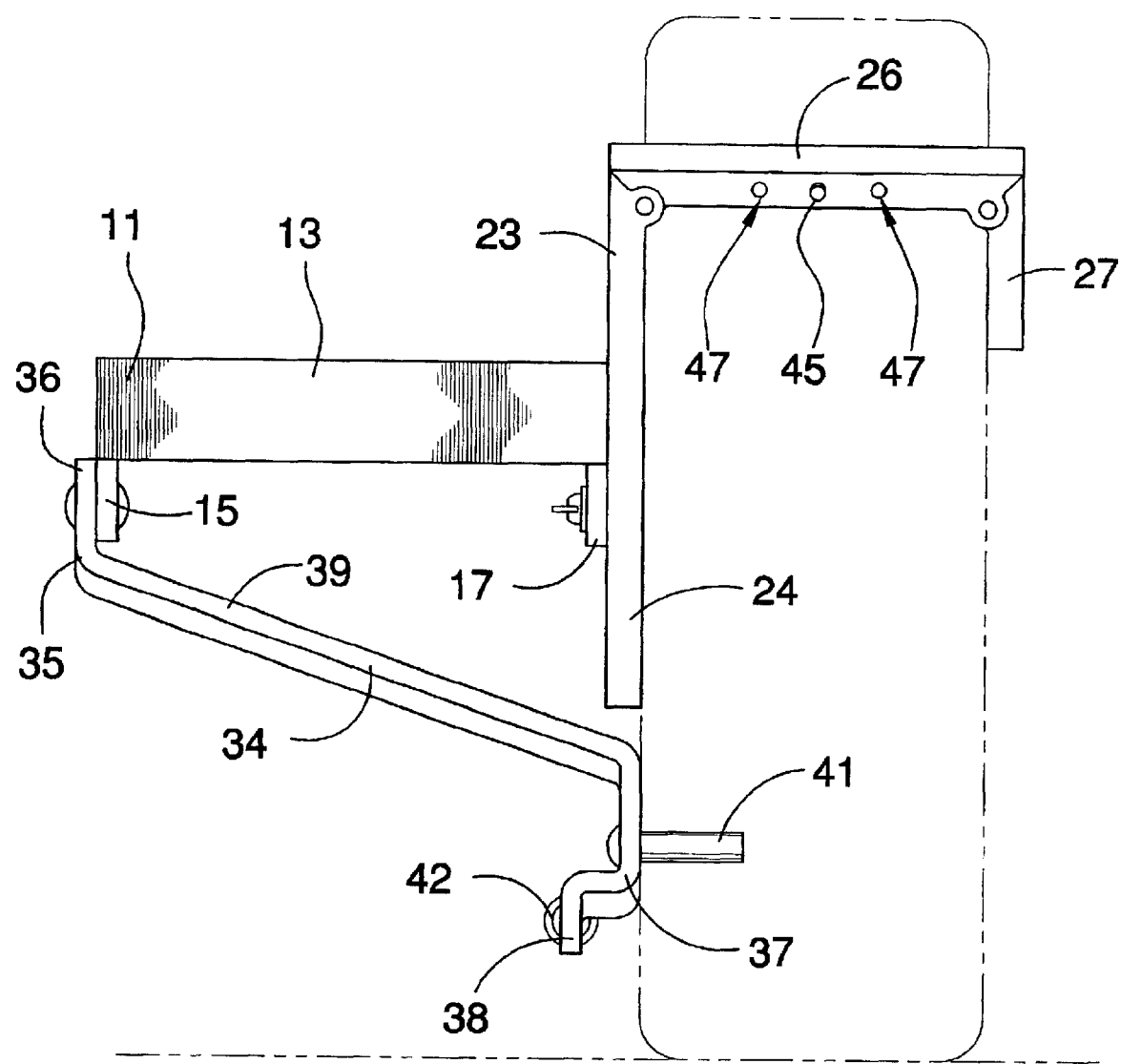
FIG. 3 is a side elevational view of the present invention.

With reference now to the drawings, and in particular to FIGS. 1 through 5 thereof, a new tire-mounted step device embodying the principles and concepts of the present invention and generally designated by the reference numeral 10 will be described.

As best illustrated in FIGS. 1 through 5, the tire-mounted step device 10 generally comprises a step 11 having a main wall 12 and a perimeter wall 13 depending downwardly along a perimeter of the main wall 12. The step 11 further includes a plurality of eyelets 14–17 being spacedly and integrally attached to the perimeter wall 13. The eyelets 14–17 include pairs of the eyelets being opposedly disposed along bottom edges of the perimeter wall 13 with the main wall 12 being generally a grate.

A bracket assembly is adjustably and foldably attached to the step 11. The bracket assembly includes a pair of first elongate members 18,23 being adjustably and conventionally fastened to one pair of the eyelets 14–17, and also includes second elongate members 21,26 being hingedly and conventionally attached to the first elongate members 18,21 and including pairs of adjustable elongate linkages having holes 47,49 therein with the elongate linkages of each pair of the elongate linkages being adjustable for adjusting the length of the second elongate members 18,21 with fastener members 45,48 being biasedly insertable in said holes 47,49 of the linkages with leaf springs 46. The bracket assembly further includes third elongate members 22,27 being hingedly and conventionally attached to the second elongate members 21,26. Each of the first elongate members 18,21 has a bottom portion 19,24 having a longitudinal slot 20,25 extending therethrough and being adjustably fastenable with a fastener to one of the eyelets 14,17. The second elongate members 21,26 are hingedly disposed generally perpendicular to the first elongate members 18,21, and the third elongate members 22,27 are hingedly disposed generally perpendicular to the second elongate members 21,26 thus forming a hook-shaped member for hooking about the exterior of the tire with the third elongate members 22,27 being collapsible upon the second elongate members 21,26 and the second elongate members 21,26 being collapsible upon the first elongate members 18,21.

A brace assembly is pivotally and conventionally attached to the step 11 and is adapted to engage the exterior of the tire. The brace assembly includes arm members 28,34 having first ends which are pivotally attached to one pair of the eyelets 14–17, and also includes tire-engaging members 40,41 being conventionally attached to second ends of the arm members 28,34 for engaging about the tire, and further includes a spring member 42 and a linking member 43 interconnecting the arm members 28,34 to bias the tire-engaging members 40,41 about the tire. Each of the arm members 28,34 has angled first and second end portions 29,31,35,37 relative to a main portion 33,39 and also has eyelets 30,32,36,38 at the first and second ends. The linkage 43 has a hook member 44 at one end which is hooked to the eyelet 32 at the second end of one of the arm members 28, and the spring member 42 is conventionally attached to another end of the linking member 43 and is hooked to the eyelet 38 at the second end of another of the arm members 34. The tire-engaging members 40,41 are generally stub shafts extending outwardly from the second end portions 31,37 of the arm members 28,34.

In use, the user unfolds the second and third elongate members 21,26,22,27 and adjusts the first elongate members 18,23 relative to the eyelets 16,17 so that the bracket assembly fits over the top of the tire with the tire-engaging members 40,41 engaging near the bottom portion of the tire with the step 11 being generally elevated above a ground so that the user can stand upon the step 11 to conveniently reach inside the engine compartment to do whatever work is necessary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the tire-mounted step device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tire-mounted step device comprising:
    a step having a main wall and a perimeter wall depending downwardly along a perimeter of said main wall, said step further including a plurality of eyelets being spacedly attached to said perimeter wall, said eyelets including pairs of said eyelets being oppsedly disposed along bottom edges of said perimeter wall;
    a bracket assembly being adjustably and foldably attached to said step; and
    a brace assembly being pivotally attached to said step and being adapted to engage an exterior of a tire.

2. A tire-mounted step device as described in claim 1, wherein said main wall is generally a grate.

3. A tire-mounted step device as described in claim 1, wherein said bracket assembly includes a pair of first elongate members being adjustably fastened to one pair of said eyelets, and also includes second elongate members being hingedly attached to said first elongate members and including pairs of adjustable elongate linkages having holes therein with said elongate linkages of each pair of said elongate linkages being adjustable for adjusting the length of said second elongate members with fastener members being insertable in said holes of said linkages with leaf springs, said bracket assembly further including third elongate members being hingedly attached to said second elongate members.

4. A tire-mounted step device as described in claim 3, wherein each of said first elongate members has a bottom portion having a longitudinal slot extending therethrough and being adjustably fastenable with a fastener to one of said eyelets.

5. A tire-mounted step device as described in claim 4, wherein said second elongate members are hingedly disposed generally perpendicular to said first elongate members, and said third elongate members are hingedly disposed generally perpendicular to said second elongate members thus forming a hook-shaped member for hooking about the exterior of the tire, said third elongate members being collapsible upon said second elongate members and said second elongate members being collapsible upon said first elongate members.

6. A tire-mounted step device as described in claim 1, wherein said brace assembly includes arm members having first ends which are pivotally attached to one pair of said eyelets, and also includes tire-engaging members being attached to second ends of said arm members and being biasedly engaged about the tire, and further includes a spring member and a linking member interconnecting said arm members to bias said tire-engaging members about the tire.

7. A tire-mounted step device as described in claim 6, wherein each of said arm members has angled first and second end portions relative to a main portion, and also has eyelets at said first and second ends.

8. A tire-mounted step device as described in claim 7, wherein said linking member has a hook member at one end which is hooked to said eyelet at said second end of one of said arm members, and said spring member is attached to another end of said linking member and is hooked to said eyelet at said second end of another of said arm members.

9. A tire-mounted step device as described in claim 8, wherein said tire-engaging members are generally stub shafts extending outwardly from said second end portions of said arm members.

* * * * *